Nov. 16, 1954  J. HANDLEY  2,694,523
ELECTRIC TOTALIZATOR SYSTEM
Filed Aug. 15, 1952  5 Sheets-Sheet 5
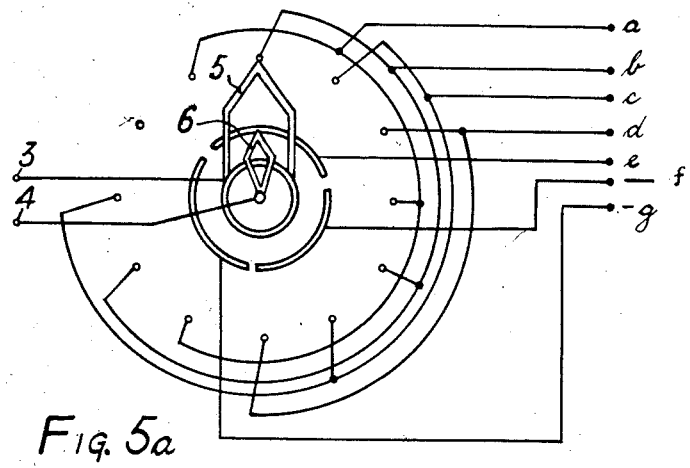
Fig. 5a
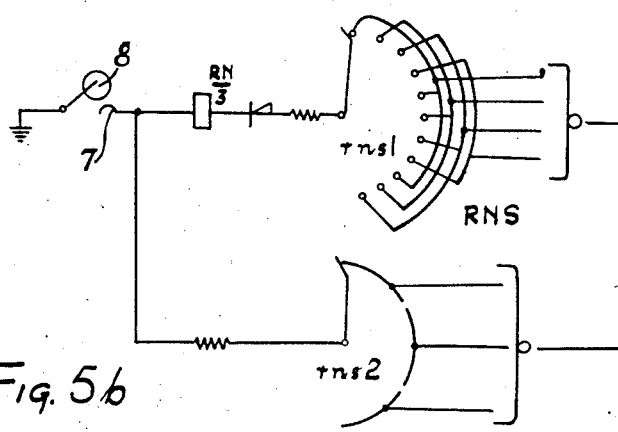
Fig. 5b
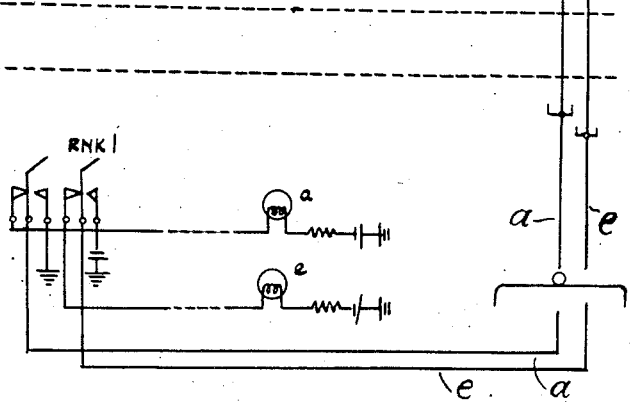
Inventor
John Handley
by
Pennie, Edmonds, Morton, Barrows & Taylor
Attorneys United States Patent Office 2,694,523
Patented Nov. 16, 1954

2,694,523

ELECTRIC TOTALIZATOR SYSTEM

John Handley, Purley, England, assignor to The Union Totalisator Company Limited, Glasgow, Scotland, a corporation of Great Britain and Northern Ireland Application August 15, 1952, Serial No. 304,606

1 Claim. (Cl. 235—92)

This invention relates to electric totalisator systems.

It is an object of the invention to provide for great flexibility of operation in enabling ticket issuing machines to sell tickets for bets in different pools and of different values using a minimum number of wires between the ticket issuing machines and a central control and counting apparatus.

It is a further object of the invention to provide safeguards to ensure that every bet is correctly registered on the counting apparatus According to the present invention there is provided a totalisator, a plurality of ticket issuing machines, common wiring interconnecting said ticket issuing machines and central apparatus, a commutator having two rings of segments which are each swept over by a rotatable wiper, in which one segment in each said ring is assigned to each ticket issuing machine and in which the first ring of segments and its wiper together with an individual connection from each ticket issuing machine to the segment of said first ring assigned thereto serve to enable said ticket issuing machines to transmit details of their bets to said central apparatus in turn, a terminating point in said central apparatus individual to each pool in which bets may be entered, and a demountable connection which is individual to each ticket issuing machine position on said second ring of segments, and in which each said demountable connection extends from the segment of said second ring of segments assigned to a particular ticket issuing machine to the terminating point individual to the pool in which bets from that ticket issuing machine are to be made, whereby a single pool ticket issuing machine can be used to send bets for any one of said pools.

According to the invention there is also provided a totalisator, a plurality of ticket issuing machines, common wiring interconnecting said ticket issuing machines and central apparatus, a commutator having two rings of segments which are each swept over by a rotatable wiper, in which one segment in each said ring is assigned to each ticket issuing machine and in which the first ring of segments and its wiper together with an individual connection from each ticket issuing machine to the segment of said first ring assigned thereto serve to enable said ticket issuing machines to transmit details of their bets to said central apparatus in turn, a terminating point in said central apparatus individual to each value of bet which may be entered in a particular pool, and a demountable connection which is individual to each ticket issuing machine position on said second ring of segments, and in which each said demountable connection extends from the segment of said second ring of segments assigned to a particular ticket issuing machine to the terminating point individual to the value of bet for which that ticket issuing machine is intended to sell tickets, whereby a single value ticket issuing machine can be used to send bets for any one of a number of values.

According to the invention there is further provided a totalisator in which groups of ticket issuing machines are connected to central counting apparatus over common wiring and over leads each individual to one ticket issuing machine and assigned by wipers rotating over a commutator, means to ensure that the ticket is printed and that the bet is correctly registered, comprising the provision of a series circuit through a relay in the ticket issuing machine, relays in the control apparatus and a commutator, and means to lock the ticket issuing machine's relay once it has operated until the ticket is printed, independent of the control apparatus, and means to lock the control relays and the commutator as soon as these relays have operated until the bet has been correctly registered independent of the ticket issuing machines.

According to the invention there is still further provided a totalisator, a number of single-value-single pool ticket issuing machines, a set of competitor leads which are common to all of said ticket issuing machines and which interconnect all of said ticket issuing machines and central counting and control apparatus, a set of competitor contacts in each ticket issuing machine for selecting the competitor for which a ticket is to be issued, a ticket release relay in each ticket issuing machine which is connected to a selected one of said competitor leads when the appropriate one of said competitor contacts is closed, a set of competitor counters and a total counter in said central apparatus for each pool (e. g. win, place, show), in which bets can be made, a set of competitor relays in said central control apparatus which are each connected at one side to a different competitor lead and which are all connected at the other side to a common connection, a plurality of pool relays in said central apparatus which are each connected at one side to a different one of a plurality of individual terminating points and which are all connected at the other side to said common point, a commutator device in said central apparatus which has two rings of segments each of which is swept over by a rotatable wiper and in which each ticket issuing machine is assigned a segment on each of said rings of segments, a lead individual to each ticket issuing machine which extends from that ticket issuing machine to the segment assigned thereto in the first of said two rings of segments, a demountable connection individual to each segment of the second of said two rings of segments which extends from that segment to that one of said pool relay terminating points which pertains to the pool in which bets from the ticket issuing machine corresponding to that segment are to be entered, and which may be so arranged as to interconnect its segment and any one of said terminating points whereby each ticket issuing machine may be used to issue tickets for bets which can be recorded in any one of said pools, means in each ticket issuing machine for applying a marking potential over its individual lead to the corresponding segment in said first ring when that ticket issuing machine is set up to transmit to said central apparatus details of a bet for which a ticket is to be issued, means connected to the wiper associated with the first ring of segments and responsive to detection of a marking potential to stop said commutator with its wipers engaging the segments assigned to the ticket issuing machine from which said marking potential was applied, means at said commutator responsive to said stoppage to apply an operating potential via the corresponding wiper to the segment of said second ring which is assigned to the ticket issuing machine causing said stoppage, whereby a series operating circuit is completed in which the selected pool relay, the selected competitor relay and the ticket release relay in the ticket issuing machine causing the stoppage are caused to operate, means in said central apparatus responsive to operation of a pool relay and a competitor relay to operate the competitor counter and the total counter for the pool in which the bet is to be entered, whereby the details of said bet are registered, means in said ticket issuing machine responsive to operation of said ticket release relay to cause a ticket to be issued, further means in said ticket issuing machine responsive to operation of said ticket release relay to break down said series operating circuit and to remove said marking potential from that ticket issuing machine's individual lead, and means in said central apparatus responsive to said removal of the marking potential to cause the commutator wipers to resume their travel in search of other set up ticket issuing machines.

The invention will now be described with reference to the accompanying drawings, in which:

Figs. 4, 5a and 5b show certain supervisory and control circuits.

Figure 1:
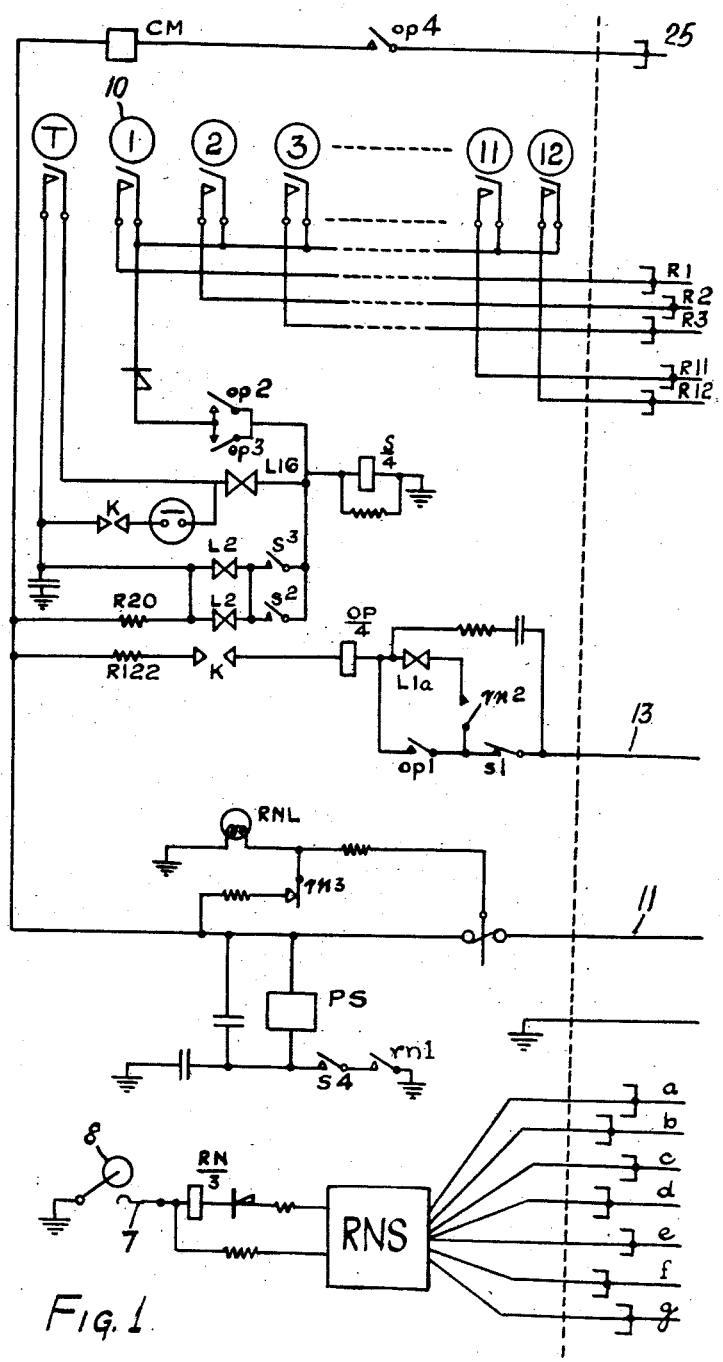
Fig. 1 shows as much of the electrical circuit of a ticket issuing machine as is necessary for an adequate comprehension of the invention.

A typical totalisator system according to the invention using single-value single pool ticket issuing machines provides for bets of $2 value in the "Win" pool, the "Place" pool and in the "Show" pool, and Combined $2 bets, i. e. bets of $2 in each of these three pools. It also provides for $5, $10 and $50 bets in Win, Place and Show pools.

The equipment is primarily intended for use in portable systems using 50 to 100 ticket issuing machines, so it is desirable that the number of wires used between the betting booths and the central control apparatus should be reduced to an absolute minimum. It is also desirable to equip each betting booth with a useful number of ticket machines for selling tickets for bets of any desired values and in any desired pool or pools. Consequently, it is preferable to be able to switch a machine to sell tickets for bets in different pools and of different values. This involves a circuit change at the central counting apparatus and a corresponding change at the ticket issuing position. In one system according to the invention, pre-printed ticket paper is used, this paper being printed or coloured to designate the stake value and the pool concerned. As an alternative, it would be possible to alter the appropriate part of the ticket printing apparatus, while as a third possibility it would be possible to exchange the actual ticket issuing machine for one whose printing apparatus prints the desired inscriptions.

The system is divided into three groups of ticket issuing machines and of control apparatus, two for low value (i. e. $2) bets on Win, Place, Show and Combined, and one for high value (i. e. $5, $10 and $50) bets on Win, Place and Show.

Thus, to have ticket issuing machines for all pools and values in any selling booth, each booth must have machines from a low value group and from a high value group.

There is a set of common competitor leads, one for each competitor, allotted to each group, and each group has a commutator or collecting switch adapted to stop at any point where a machine is waiting to collect a bet. As a bet of $2 Win, $2 Place, $2 Show or $2 Combined may be sent over the same competitor lead, this lead is taken through a "competitor" relay to a common point to which all competitor relays in this group are connected and to which Win, Place, Show and Combined pool relays are also connected. The other sides of the latter relays are each taken to a terminating point individual to that type of bet. This terminating point is then connected over a demountable connection to a segment on the commutator individual to this ticket issuing machine for which the commutator has stopped. Thus when a ticket issuing machine sends a bet on any competitor the particular competitor relay will operate and either Win, Place, Show or Combined pool relay will operate according to which terminating point is taken to battery via the commutator. The appropriate selection of counters then operate in response to the operated competitor relay and pool relay.

To enable a ticket issuing machine to be changed from any one pool to any one other pool, the wire from the contact or segment on the commutator for each ticket issuing machine's operating position can be connected to the terminating point appropriate to the pool for which it is desired to use that ticket issuing machine. The operating circuit described above is then completed via that one of the pool relays so connected, and subsequent bets from that ticket issuing machine are registered on the appropriate counters. The operation necessary to the ticket issuing machine itself has been described already.

For the high value group of ticket issuing machines, which includes machines for $5, $10 and $50 in each pool, there is a pool relay for each of the following: $5 Win, $10 Win, and $50 Win; $5 Place, $10 Place and $50 Place; and $5 Show, $10 Show and $50 Show. As in the case of the low value group circuits, all of these pool relays are connected in common to the commoned connection to the competitor relays. At their other ends, each pool relay is connected to a separate individual terminating point so that any ticket issuing machine position can have the wire from its commutator segment in the operating circuit connected to the terminating point for any high value and any pool.

To ensure that each bet is correctly registered on the competitor and grand total adding machines, the commutator is held until a signal is received by a relay indicating that the adding machine armatures have fully operated. This same relay prevents another bet being taken until the adding machine armatures are fully restored to normal after registering the bet.

Provision is made to ensure that once a bet has been initiated by a ticket issuing machine, although the machine is allowed to issue its ticket, the competitor and pool relays remain held in case of a fault, and signal lamps indicate the competitor, stake and pool and ticket issuing machine from which the fault originated. To guard against outside interference during a hold up a slow operating hold up relay operates and causes isolating relays to operate to disconnect the competitor leads from the control apparatus until the fault is cleared.

The circuits shown relate to one low value group, in which it is assumed that all ticket issuing machines are used to issue $2 bets, and any ticket issuing machine can be so connected at the control apparatus as to be usable for issuing tickets for bets in any one of the pools.

Figure 2:
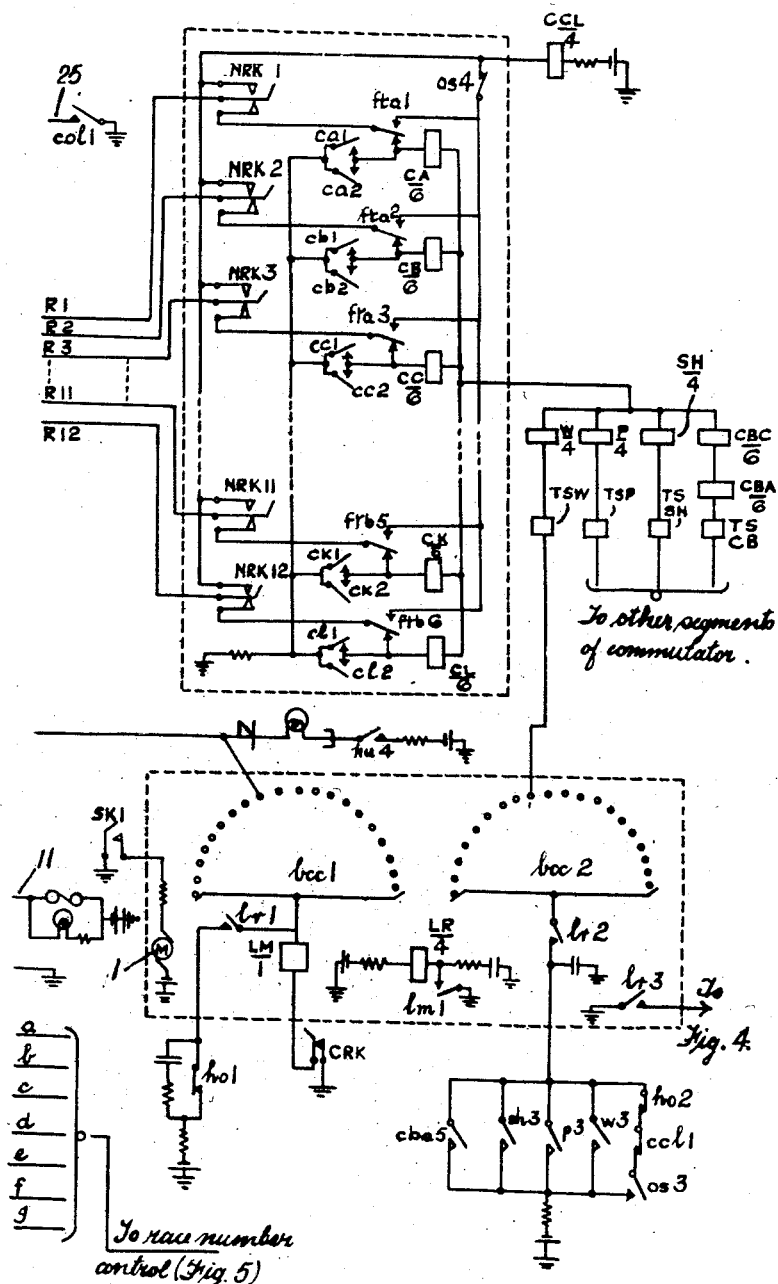
Fig. 2 shows that part of a central counting and control apparatus which includes competitor relays, pool relays, and a commutator.

In Fig. 2 is shown the commutator used for successively connecting ticket issuing machines to the control and counting apparatus. This commutator is drawn as if it were single motion telephone-type selector but it is in actual fact a commutator similar to that used in the system described in our British Patent No. 572,103 (corresponding U. S. Patent 2,479,681). As shown in Fig. 2, there are two sets of commutator contacts which are shown as two contact banks bcc1 and bcc2 respectively. Each contact on one of these banks represents a segment of the commutator. The commutator has two concentric rings of segments which are moved over by respective wipers. The contacts of these banks are referred to throughout as commutator segments.

The start key SK is thrown and this closes at SK1 (Fig. 2) a circuit through the commutator motor 1 which rotates the wipers. This same key at SK2 (Fig. 4) also closes a circuit to an indicator lamp L2. At SK3 (Fig. 4) it prepares a circuit for the open sales relay OS.

The open sales key OSK (Fig. 4) is then thrown and this at OSK1 completes a circuit for the open sales relay OS, which operates and closes contacts os1 to operate a booth lamp L3 in each booth, so as to signal to the various booths to start selling. At os2 a holding circuit for OS is prepared, this serving as will be described to prevent OS from being released whilst a bet is being registered, and at os3 (Fig. 2) a circuit for a battery connection to contacts of bcc2 of the commutator is prepared. Contacts os4 open to isolate the cancel relay CCL from the fault relay contacts.

The operating circuit for relay OS is shown as including a broken line connection. In the circuit being described, this connection includes a socket in which can be inserted a plug connecting the circuit to testing equipment. As this equipment has no bearing on the present invention it will not be described. There are shown two additional open sales relays OSB and OSC whose circuits are closed at contacts OSK2 and OSK3 respectively of the open sales key. These additional relays are provided for two other groups of ticket issuing machines, which groups each have their own commutator and counting apparatus. As has already been indicated the commutator is represented in Fig. 2 as if it was a simple form of single motion switch in the interests of simplicity of the circuit.

The next operation is for the race number key to be set to the position for the race for which bets are to be accepted. It is assumed that this is race Number 1, so (see Fig. 5b), race number key 1 is thrown and the ticket issuing machine operators turn their race number switches RNS to race 1. This positions the printing roller (not shown) correctly to print Race "One" on the ticket. Battery is then fed by race number key RNK1 wire e, and the first long segment of bank rns2 of RNS to relay RN, and back via contact 1 of rns1, wire a, and race number key RNK1 to earth, so that relay RN operates. At contact rn1 (Fig. 1) it prepares a circuit for the printing solenoid PS, at contact rn2 a circuit is closed to give the ticket issuing machine access to the commutator, and at contact rn3 the circuit of the race number lamp RNL is broken, thus putting this lamp out.

In Figs. 1 and 2 the circuit of this race number switch is not shown in full, but it is shown in detail in Figs. 5a and 5b. Fig. 5a shows the arrangement of the contacts of this switch, and it will be seen that there are two input leads 3 and 4 respectively. Of these, lead 3 can be connected to any one of twelve terminals while input lead 4 can be connected to any one of three long segments. The movable contacts 5 and 6 which effect this connection move together. The twelve outer contacts are multipled in sets of three to four control leads a, b, c and d, and the three long segments are connected respectively to control leads e, f and g. It will be noted that these contacts are represented as contact banks rns1 and rns2 in the circuit diagram of Fig. 5b. When a race number switch is operated at the control station, as has been described above for race Number 1, it earths one lead of a to d and puts battery on one lead of e to g. When the ticket machine race number switch is set to the position for the same race as the operated control switch the relay RN (Figs. 5 and 1) is operated, as described above.

The circuit for RN also includes the "no paper" alarm. This is a contact 7, which is earthed via roller 8 when ticket paper is exhausted. This short circuits relay RN, which thereupon releases and disables the ticket machine.

To register a bet the operater depresses the competitor key, for example key 10 for competitor 1, for the competitor on which the first bet is made. This closes the key contact, and when the selected competitor key is fully depressed and mechanically locked, contact K closes by mechanical means (not shown). When the commutator wipers arrive at the position to which this ticket issuing machine is wired, the following circuit is completed: battery in Fig. 2, lead 11 to the ticket issuing machine, resistor R122, contact K, relay OP, contact Lla, front contact rn2, back contact s1, lead 13 to the control apparatus, the commutator contact for that ticket issuing machine, the commutator wiper, clutching relay LM and commutator release key CRK to earth. LM operates and operates clutching means (not shown) to arrest the commutator. It also closes contact lm1 to operate relay LR. Relay LM is locked by contact lr1, over contact ho1 to battery, and contact lr2 closes to feed battery via contact os3, ccl1 and ho2, to the wiper on bank bcc2 of the commutator. Contacts lr3 close and complete the holding circuit for relay OS (Fig. 4) over contacts os2 to prevent the open sales relay OS from restoring while the commutator is held stationary.

At the same time relay OP (in the ticket issuing machine, Fig. 1) operates in the same series circuit, closing contact op1, which bridges contacts Lla and rn2, and closing contacts op2 and op3. Contacts op2 and op3 in parallel close a circuit from earth via relay S, competitor key No. 1, runner lead R1 to the control apparatus, contacts NRK1 of non-runner key 1, contact fta1, competitor relay CA, Win relay W (assuming that the bet is a Win bet), terminating point TSW, segment for the "calling" ticket issuing machine on bank bcc2 of the commutator, commutator wiper, contacts lr2, ho2, ccl1 and os3 to battery. Relay S operates, locking over contacts s2 and s3 in parallel, contacts L2, resistance R20 and lead 11 to battery in Fig. 2. Contact s1 opens and releases relay OP, and contact s4 closes and energises the printing solenoid PS. When the printing solenoid has almost fully operated, it causes contacts L2 to open and release relay S which in turn releases the printing solenoid PS at s4, so that the solenoid restores to rest and issues the ticket.

It will be noticed that for security of operation, the operating and holding circuits of relay S include duplicated contacts op2, op3, and s2, s3 and L2 in parallel. There are twelve competitor keys per ticket machine since the system described is intended for use in the United States of America, in which horse races are limited to a maximum of twelve runners. For runners one to twelve we have competitor relays CA to CL respectively. Each competitor relay is connected to the appropriate commoned competitor lead via a contact of a fault alarm relay and via a non-runner key. Thus CA is connected to lead R1 via fta1 of a fault relay FTA, and NRK1. If any competitor becomes a non-runner (or of course where there are less than twelve runners) the appropriate non-runner key (or keys) is (are) operated. When a non-runner key is operated the series operating circuit is disconnected from the competitor relay and connected over the front contact of the non-runner key to the cancel relay CCL. If a ticket machine operator tries to register a bet on a non-runner, CCL operates and at ccl1, Fig. 2, closes a circuit for the cancel magnet CM, Fig. 1, this circuit being from ccl1, via lead 25, front contact op4 winding of CM, and lead 11 to battery in Fig. 2. The cancel magnet thereupon resets the ticket machine to normal without a ticket being issued.

The competitor relay CA (for competitor No. 1) which operated in the series circuit described above is held operated over contacts ca1 and ca2 in parallel, and pool relay W which also operated in this series circuit is also held operated via ca1 and ca2. These two relays by closing their contacts ca3 and w1 (Fig. 3) close a circuit through magnet WUC of No. 1 Win adding machine and magnet WUT of the Win total adding machine to register a $2 bet on No. 1 competitor for a Win. When these two magnets have fully operated earth is fed via contacts wuc1, w2, wut1, cba1, sg1 and ccg1 to the winding of relay HO and to battery. HO therefore operates and locks over contacts ho3, and contacts wuc2 and wut2 in parallel until both the counting magnets have fully restored. The contact ccg1 is normally closed. Although when CA operated it closed a circuit for relay CCG, Fig. 4, over ca6, the resistance in series therewith is such that CCG does not operate. It only operates if more than one competitor relay operates, when it operates the alarm bell AL at ccg2 and at ccg1 disables the circuit for HO.

When relay HO operates, the commutator is released by contacts ho1, to restart and to search for another ticket issuing machine waiting to issue a ticket. Further description of relay HO will be given later.

Should it be necessary to change this machine to issue $2 ticket on another pool, say on the Place Pool, the wire attached to the contact of the commutator bank bcc2 (actually the inner commutator segment) for that ticket issuing machine is disconnected from terminating point TSW and plugged into terminating point TSP. Each of these terminating points is preferably a number of jack sockets, the wire from the commutator ending in a jack plug. In this case when the series circuit is set up relays CA and P will operate, closing a circuit through the magnet PUC of No. 1 Place adding machine and PUT of the Place total adding machine via contacts ca4 and p1, to register a $2 bet on No. 1 competitor for a Place. Similarly by plugging the inner commutator lead into terminating point TS.SH a $2 bet will be registered on No. 1 competitor for Show, using counters SUC and SUT. Corresponding changes to the ticket issuing machines are made as already described.

For combined bets, that is Win, Place and Show on one ticket, the commutator lead will be plugged into terminating point TS, CB. Relay CBA is a helping relay for relay CBC. For a combined bet on competitor No. 1, relays CA, CBC and CBA will operate, and contacts ca3 and cba2 closing will register a bet on Win No. 1 competitor adding machine and the Win total adding machine. Contacts ca4 and cba3 closing will register a bet on No. 1 Place competitor adding machine and the Place total adding machine, and contacts ca5 and cba4 closing will register a bet on No. 1 Show competitor adding machine and on the Show total adding machine. Thus the bet has been registered on six adding machines.

As has already been described, this circuit alteration at the control apparatus necessitates a corresponding simple alternation in the printing portion of the ticket issuing machine in question, or a change of the ticket machine connected to that commutator segment, or a change of the ticket paper used in the ticket issuing machine.

To check the full operation of these six magnets change-over contacts cbc1 and cbc2 are operated and contact cba1 is opened. Then relay HO will not operate to signal that the bet has been registered on all six adding machines until the following circuit has been closed; earth, contacts wuc1, cbc3, wut1, put1, cbc4, puc1, cbc1, cbc2, suc1, cbc5, sut1, sg1, ccg1, relay HO and battery. Relay HO cannot restore after signalling that a bet has been registered if any one of contacts wuc2, puc2, suc2, wut2, put2 and sut2 remains closed.

Although the commutator has been released and might have stopped at the next waiting ticket issuing machine, this machine will not operate until the relay HO has restored, as the series circuit through relay S, a competitor relay such as CA and a pool relay such as W is broken by contacts ho2. This also applies in the case of a bet in a single pool.

To prevent a fault occurring through sales being closed whilst a bet is being registered, the open sales relay OS (Fig. 4) is held operated over contacts os2 and lr3 until the commutator is released. Contacts ho2, ccl1 and os3 are guarded by one of contacts w3, p3, sh3 and cba5.

It will now be understood that the principle of ensuring that the ticket issuing machine is operated and the bet registered is that of operating the ticket issuing machine relay (i. e. relay S, Fig. 1), a competitor relay (e. g. relay CA, Fig. 2) and a pool relay (e. g. relay W, Fig. 2) in series, and then locking the ticket issuing machine relay until the printing operation is completed independent of the control apparatus and locking the control relays and commutator independent of the ticket issuing machines, until the bet is correctly registered.

If any adding machine fails to register its bet and holds the commutator longer than usual, a slow operating relay HU (Fig. 4) operates over lr3, and at contact hu1 lights lamp HUL. It also rings an alarm bell AL over contact hu2. This relay operates two more relays FTA and FTB at contact hu3. Relays FTA and FTB isolate all the competitor leads at contacts fta1, 2, 3, ftb1, 2, 3, etc., connecting them over a common wire to contacts os4. In addition to isolating the apparatus from outside interference this also provides a means to cancel all ticket issuing machines set up to bet after close of sales, all machines then having their leads routed via contacts fta1, 2, 3, etc., and contacts os4 now closed to the cancel relay CCL. The cancel relay has a high resistance winding and as it is in this case in series with relay S, S will not operate. Any machine operating the cancel relay will receive a cancel pulse via contacts ccl1 and contacts op4, to its cancel magnet, which will operate and restore the operated key to normal. This condition will also apply when an operator attempts to obtain a ticket for a competitor that has been made a non-runner by throwing the non-runner key (see above).

In case of a fault with the commutator held, signal lamps are provided to indicate the nature of the fault.

First the relay HU (Fig. 4) having operated as already described closes contacts hu1, connecting battery to the hold up lamp HUL. Provided that the circuit is closed through the S relay of a ticket issuing machine, a competitor relay (e. g. CA, Fig. 2), and a pool relay (e. g. W, Fig. 2, assuming that the bet is $2 Win on competitor No. 1) will be operated, and the appropriate competitor lamp LR1 (Fig. 4) in the example quoted will be alight via contacts ca6, and a Pool lamp, the Win lamp SLW2 in the example quoted, will be alight via contacts w4. If the hold off lamp HOL glows via contacts ho4 this will indicate that one or the other of the adding machines counting magnets have not restored, in which case in the quoted example the adding machine's supervisory lamp for Win 1 will be lighted through contacts wuc3, Fig.3, or the total Win supervisory lamp will be alight via contacts wut3, Fig. 3.

In the case of a fault caused through a short circuit between two competitor leads, say competitor leads No. 1 and No. 2, two competitor relays CA and CB in this example will operate together. In this case the runner lamps LR1 and LR2 will light via ca6 and cb6 allowing more current to flow through the marginal guard relay CCG, and this relay will operate, opening contacts ccg1, to prevent the relay HO from operating to release the commutator.

In this case the competitor leads would be tested and different sections of machines unjacked until the short circuit is cleared before betting is re-started.

Should a fault arise through a short circuit between any of the terminating points TSW, TSP, TS.SH or TS.CB, more than one of the pool relays will operate, and the marginal guard relay SG (Fig. 4) will operate and perform similar functions.

In all cases when a fault is cleared, the maintenance mechanic will make the appropriate adjustment to the counters.

It will now be apparent that where any ticket issuing machine attempts to register a bet, if the bet is not registered correctly without delay:

(a) The commutator will be held and the competitor leads isolated.

(b) If the series circuit has not been completed through the three relays the ticket issuing machine will receive a cancel signal, and will continue to receive cancel signals if set-up again whilst the nature of the fault is being located and cleared.

(c) If the series circuit has been completed the machine will issue its ticket and the competitor and pool relays will indicate the bet that has been transmitted to the control apparatus by signal lamps whether or not the bet has been registered correctly, whilst the commutator remains held. Any further attempts by the machine to issue will be cancelled.

(d) In the case of a short circuit between competitor leads, the fault will be indicated and the commutator will be held, indicating the machine from which the fault originated, and any further attempts to issue will be cancelled.

Figure 3:
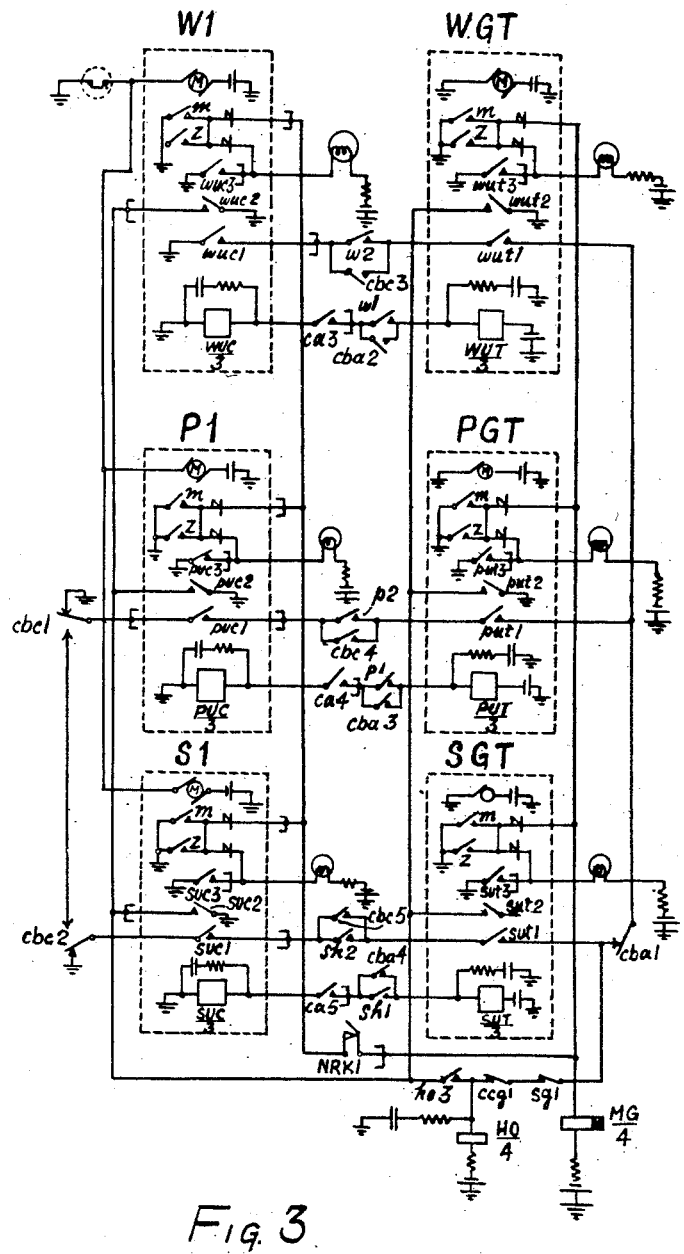
Fig. 3 shows the electrical circuit of three grand total counters, one each for Win, Place and Show bets, and a typical runner counter for each of these pools.

Each aggregator, see Fig. 3, includes a motor M, and when the motor is running a motor contact m individual to that motor is open. If any motor stops its contact m closes and lights the supervisory lamp for that counter and also operates the relay MG. It will be noted that any operated non-runner key also isolates the counters for that runner from MG.

Figure 4:
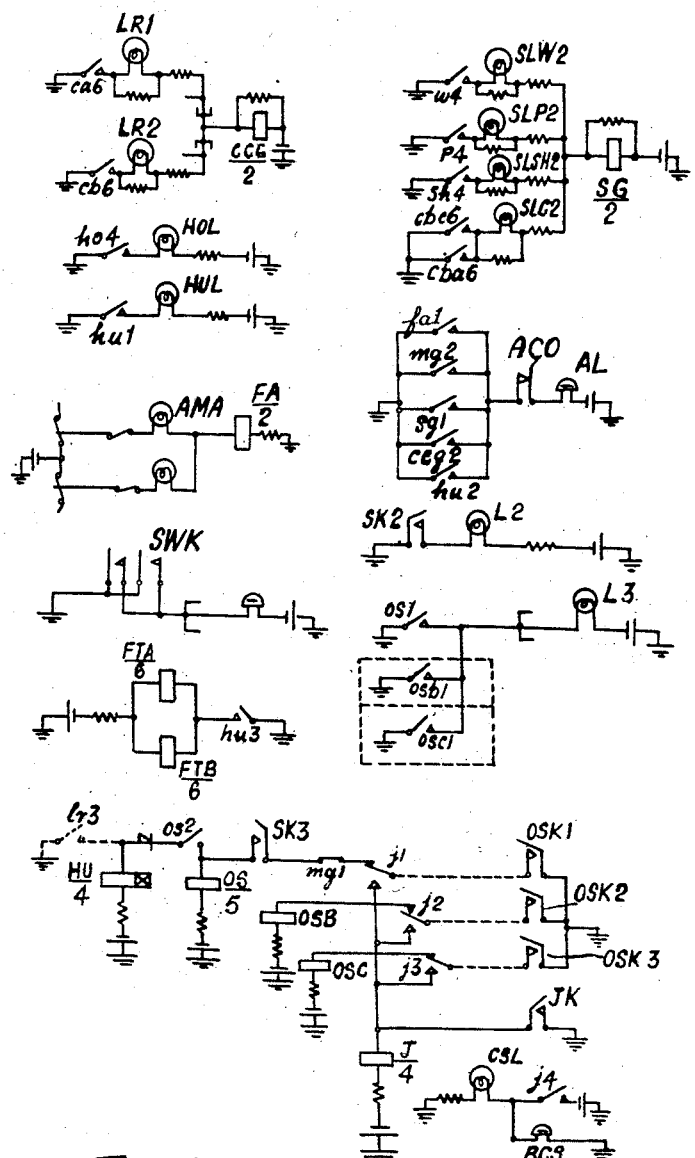

When MG operates, it releases the open sales relay at mg1 (Fig. 4), and gives an alarm at mg2 (Fig. 4). The illuminated counter lamp shows which motor has broken down. Other MG contacts (and other start key contacts) are in series with the open sales relays OSB and OSC, if used.

When the counters are zeroised between races, a zeroising lever (not shown) is operated and this restores each counter mechanically to its zero condition. While the zeroising is in progress, a contact z in parallel with contact m is closed in each counter circuit.

This renders it impossible for bets to be received during zeroising. When the zeroising lever is released after the counters have zeroised, all z contacts re-open, releasing MG.

When it is desired to close the sale of tickets on a race one of the judges operates key JK (Fig. 4), which operates relay J. This operates its changeover contacts j1, j2 and j3, which break the operating circuits of OS, OSB and OSC respectively, and also complete holding circuits for relay J. Contact j4 operates the close sales lamp CSL and bell BCS. OS then releases, extinguishing all booth lamps such as L3 (Fig. 4). The open sales key and start key are then restored to normal.

The system described has been assumed to comprise two low value groups of ticket issuing machines and one high value group of ticket issuing machines. All groups share the same counters (see Fig. 3), but separate sets of $2 bet receiving magnets are provided for each low value group. That is, two magnets such as WUC are provided for counter W1, and so on.

For the high value group there is also one magnet per high value, i. e. one each for $5, $10 and $50 on each counter. These magnets are not shown in order not to unduly complicate Fig. 3. Obviously the magnets for different values cause correspondingly different numbers of units to be registered. When using escapement-controlled differential counters the counter shaft revolves 2½ times as much for a $5 bet as for a $2 bet, twice as much for a $10 bet as for a $5 bet, and so on.

Each of the two low value groups of ticket issuing machine is served by a different commutator of the type described in our British Patent No. 572,103 (corresponding U. S. Patent 2,479,681). For each low value group there is a separate set of pool relays and competitor relays, which control the second set of $2 magnets on the counters, which magnets have already been described.

For the high value group there is provided a pool relay for each bet value. In the actual installation which has been described there is no combined betting facility on the high value ticket issuing machines, so this means that nine pool relays are needed in the control circuit of Fig. 2. Each counter therefore has one bet receiving magnet for each of $5, $10 and $50 bets.

The operation is the same as for the low value group except that each competitor relay is replaced by two relays in series in order to reduce the load of contacts to be operated by each relay.

What is claimed is:

In a totalisator, a number of single-pool ticket issuing machines, a set of competitor leads which are common to all of said ticket issuing machines and which interconnect all of said ticket issuing machines and central counting and control apparatus, a set of competitor contacts in each ticket issuing machine for selecting the competitor for which a ticket is to be issued, a ticket release relay in each ticket issuing machine which is connected to a selected one of said competitor leads when the appropriate one of said competitor contacts is closed, a set of competitor counters and a total counter in said central apparatus for each pool (e. g. win, place, show), in which bets can be made, a set of competitor relays in said central contral apparatus which are each connected at one side to a different competitor lead and which are all connected at the other side to a common point, a plurality of pool relays in said central apparatus which are each connected at one side to a different one of a plurality of individual terminating points and which are all connected at the other side to said common point, a commutator device in said central apparatus which has two rings of segments each of which is swept over by a rotatable wiper and in which each ticket issuing machine is assigned a segment on each of said rings of segments, a lead individual to each ticket issuing machine which extends from that ticket issuing machine to the segment assigned thereto in the first of said two rings of segments, a demountable connection individual to each segment of the second of said two rings of segments which extends from that segment to that one of said pool relay terminating points which pertains to the pool in which bets from the ticket issuing machine corresponding to that segment are to be entered, and which may be so arranged as to interconnect its segment and any one of said terminating points whereby each ticket issuing machine may be used to issue tickets for bets which can be recorded in any one of said pools, means in each ticket issuing machine for applying a marking potential over its individual lead to the corresponding segment in said first ring when that ticket issuing machine is set up to transmit to said central apparatus details of a bet for which a ticket is to be issued, means connected to the wiper associated with the first ring of segments and responsive to detection of a marking potential to stop said commutator with its wipers engaging the segments assigned to the ticket issuing machine from which said marking potential was applied, means at said commutator responsive to said stoppage to apply an operating potential via the corresponding wiper to the segment of said second ring which is assigned to the ticket issuing machine causing said stoppage, whereby a series operating circuit is completed in which the selected pool relay, the selected competitor relay and the ticket release relay in the ticket issuing machine causing the stoppage are caused to operate, means in said central apparatus responsive to operation of a pool relay and a competitor relay to operate the competitor counter and the total counter for the pool in which the bet is to be entered, whereby the details of said bet are registered, means in said ticket issuing machine responsive to operation of said ticket release relay to cause a ticket to be issued, further means in said ticket issuing machine responsive to operation of said ticket release relay to break down said series operating circuit and to remove said marking potential from that ticket issuing machine's individual lead, and means in said central apparatus responsive to said removal of the marking potential to cause the commutator wipers to resume their travel in search of other set up ticket issuing machines.

References Cited in the file of this patent

UNITED STATES PATENTS

| Number | Name | Date |
| --- | --- | --- |
| 1,084,684 | Williams | Jan. 20, 1914 |
| 2,007,402 | Limb | July 9, 1935 |
| 2,032,972 | Black et al. | Mar. 3, 1936 |
| 2,068,719 | Troutman | Jan. 26, 1937 |
| 2,071,184 | Stewart et al. | Feb. 16, 1937 |
| 2,332,756 | Robinson | Oct. 26, 1943 |
| 2,479,681 | Handley | Aug. 23, 1949 |
| 2,592,312 | Milburn | Apr. 8, 1952 |
| 2,605,967 | Stone | Aug. 5, 1952 |